United States Patent [19]

Anders et al.

[11] 4,104,100

[45] Aug. 1, 1978

[54] PROCESS FOR ANODIC ELECTRODEPOSITION OF AQUEOUS EMULSIONS

[75] Inventors: Dale F. Anders, Fox River Grove; Peter V. Brizgys, Chicago; Ronald Mattiuz, Downers Grove, all of Ill.; Edward J. Murphy, Williamsport, Pa.

[73] Assignee: DeSoto, Inc., Des Plaines, Ill.

[21] Appl. No.: 741,386

[22] Filed: Nov. 12, 1976

[51] Int. Cl.² ............................................. C25D 13/08
[52] U.S. Cl. ................................................. 204/181 R
[58] Field of Search .................................... 204/181 R

[56] References Cited

U.S. PATENT DOCUMENTS

| | | | |
|---|---|---|---|
| 3,634,348 | 1/1972 | Carter | 204/181 R |
| 3,730,865 | 5/1973 | Kapalko et al. | 204/181 |
| 3,761,371 | 9/1973 | Dickie et al. | 204/181 R |
| 3,983,059 | 9/1976 | Sekmakas | 204/181 |
| 4,001,150 | 1/1977 | Juna et al. | 204/181 |

Primary Examiner—Howard S. Williams
Attorney, Agent, or Firm—Dressler, Goldsmith, Clement, Gordon & Shore, Ltd.

[57] ABSTRACT

Monoethylenic monomers are copolymerized in aqueous emulsion in the presence of about 0.5–5% of a polyanionic phosphate-based emulsifying agent to provide a stable aqueous emulsion which electrodeposits at the anode to form a continuous film of high quality.

14 Claims, No Drawings

PROCESS FOR ANODIC ELECTRODEPOSITION OF AQUEOUS EMULSIONS

The present invention relates to the electrodeposition of emulsion copolymers at the anode of a unidirectional system.

The electrodeposition of polyanionic resins on the anode from an aqueous dispersion or solution is well known. In the conventional system, the polyanionic resin is a low molecular weight, solvent soluble carboxyl-functional resin which, when the resin is a copolymer of monoethylenic monomers, is provided by copolymerization in solution in a water miscible organic solvent. This carboxyl-functional polymer is then reacted with a base, usually a volatile amine such as triethyl amine to form a polymer salt. This polymer salt is then dispersed in water, the water miscible organic solvent helping to solubilize the polymer salt in the water.

The film properties produced by electrodepositing the conventional systems noted above have been inadequate because of the relatively low molecular weight of the soluble polymers employed. These inadequate properties persist even when thermosetting systems are used. A thermosetting system is illustrated by the use of a carboxyl-functional polymer which includes hydroxy groups in addition to the carboxyl groups in combination with an aminoplast resin. These two materials are co-deposited on the anode and they react with one another on subsequent baking to build the final resin in situ. This provides improved film properties, but these are still inadequate, particularly from the standpoint of corrosion and weather resistance. Also, water miscible organic solvent is still necessary for proper dispersion of the carboxyl-functional polymer, and this adds expense as well as raising a problem of pollution.

The art has tried to use the much higher molecular weight resins provided by copolymerization of monoethylenically unsaturated monomers in aqueous emulsion. For example, U.S. Pat. No. 3,403,088 describes some of the conventional systems, and this patent includes an Example 5 which shows (without providing the details of emulsion polymerization) an aqueous emulsion copolymer including 5% by weight of methacrylic acid. There are 17 examples in this patent, including the noted Example 5, and these many examples are evaluated in Table I which presents a single film characteristic (its thickness in mils). Thicknesses are specified in 16 instances, but only a dotted line appears to characterize the film which might have been obtained for the composition of Example 5.

Our experience with copolymers produced by polymerization in aqueous emulsion varies with the surfactant which is employed. Nonionic surfactants lack the capacity for electrophoretic migration, and are not useful. With usual anionic surfactants, such as sodium lauryl sulfate, which is monofunctional, gasing and coagulation occur at the anode, depositing a porous nonuniform mass which is hard to characterize as a film. This unfortunate result may account for the failure of the prior patent noted above to set forth a film thickness for its single emulsion system. Of course, one cannot be sure because the patent does not identify the surfactant employed.

In accordance with the present invention, monoethylenically unsaturated monomers are copolymerized in aqueous emulsion in the presence of about 0.5–5% of a polyanionic phosphate-based emulsifying agent to provide a stable aqueous emulsion which electrodeposits at the anode to form a continuous film of high quality.

Because of the high molecular weight of the emulsion copolymer, it is not essential to employ curing agents as is normally required in order to build desired film properties into the solution copolymers used in the prior art. Also, and since the carboxyl functionality in the emulsion polymer is not relied upon for electrophoretic migration, the copolymer may include less acid, or no acid, and the reduced acid content leads to superior corrosion resistance. A small amount of acid, up to about 3%, is useful to improve adhesion and bath stability. Such amounts of acids do not provide water dispersibility, nor do they enable controlled and useful electrophoretic mobility and deposition. Aminoplast resins may optionally be present in the electrocoating bath when active hydrogen groups are present in the emulsion copolymer to react therewith on subsequent baking to further improve the film characteristics which are obtained, particularly film hardness.

These active hydrogen groups may be provided in diverse manner, monomers containing carboxyl groups (acrylic acid), hydroxyl groups (2-hydroxy ethyl acrylate), amide groups (acrylamide), or N-methylol groups (N-methylol acrylamide) being useful in amounts of from 1–20%, preferably 2–10%.

Before discussing the various aspects of the invention in greater detail, it is desired to stress that the porportion of polyanionic phosphate-based emulsifying agent should not exceed 5%, even though the presence of large amounts is not inconsistent with the emulsification purpose. However, proportions of polyanionic emulsifying agent in excess of 5% degrade film performance and are thus detrimental.

It is also desired to point out that water miscible organic solvents are either totally absent or present in small amount, preferably less than about 10%, based on the weight of the polymer. At higher solvent content, the rupture voltage of the system degrades. The lowered proportion of solvent reduces the cost of the system, and avoids some of the solvent pollution previously encountered in anodic electrocoating.

When using higher glass transition temperature emulsion polymers, especially those having a $T_g$ above 0° C., water immiscible organic solvents are helpful as coalescing agents in amounts of from 5–15% based on the weight of the resin. These water immiscible solvents are illustrated by mineral spirits, 2-phenoxy ethanol methyl octyl ketone, 2-ethyl hexanol and aromatic hydrocarbon mixtures such as Solvesso 150. $T_g$ designates the glass or second order transition temperature which is calculated, in well known fashion from the monomers used, and their proportion.

The monomers which are copolymerized in aqueous emulsion consist essentially of monoethylenically unsaturated monomers, through up to about 10% of polyethylenic material may be included.

Preferred copolymers consist essentially of monoethylenically unsaturated monomers and have a $T_g$ below 10° C., except where coalescing solvents or a high temperature bake are used. At higher $T_g$, ordinary solution copolymers are brittle, but the use of copolymers having a molecular weight above 50,000 (measured by membrane osmometry) enables the flexibility of the polymer to be maintained. Also, and by selecting low $T_g$ copolymers, or by using colescing solvents with high $T_g$ copolymers, it is possible to electrodeposit a film which does not require baking, or which can be baked at lower temperature than heretofore required, a 350° F. or higher temperature bake being normally essential in the prior art to obtain the needed thermosetting cure. Films which provide good properties by baking at a temperature of less than 300° F. are a feature of this invention. This means that after the film is electrodeposited and the coated anode is removed from the bath, it can simply be allowed to dry in air, or given a minimal low temperature dry, either with or without rinsing the same with water.

In many instances it is desired to electrodeposit films which are flexible and extensible. This is not possible with the low molecular weight solution copolymers normally used since these are brittle unless highly cross-linked, usually with aminoplast resin, and the cross-linked films are not extensible. The emulsion copolymers used herein are of much higher molecular weight, and cross-linking can either be omitted or minimized. This allows electrodeposition of films possessing different and more desirable physical and chemical properties than were heretofore possible. Specifically, coatings can be provided which are tougher, more flexible and possess much greater impact resistance.

While the aminoplast resin used herein are the same water soluble and water dispersible materials normally used, such as hexamethoxy methyl melamine or water dispersible partially ethylated or propylated derivatives thereof, they are used herein in smaller amount. Thus, we use 2–10% of aminoplast resin based on total resin, while 15–30% is normally used. This lowers the cross link density and yields of less brittle film. Instead of or in addition to the use of aminoplast resins, one can employ water dispersible heat-hardening phenolic resin, as described in U.S. Pat. No. 3,963,663 issued June 15, 1976, especially with a copolymer containing an amine monomer, such as dimethyl amino ethyl acrylate.

While high molecular weight is useful herein, a mercaptan may be used in the emulsion copolymerization to moderate molecular weight and thereby obtain better gloss while still achieving some of the objectives of this invention. The use of mercaptans to lower molecular weight is itself well known, as are the mercaptans useful for this purpose.

The polyanionic phosphate-based emulsifying agents which are useful in this invention are known materials. In general, they are polyanionic phosphate ester surfactants which are the esterification reaction product of about 1 mol of phosphoric acid per hydroxy equivalent in a nonionic surfactant having a polyoxyethylene hydrophilic chain. The products which are useful herein will be easily understood when it is recalled that nonionic surfactants are formed when ethylene oxide is adducted upon a hydrophobic organic compound in order to provide an hydroxy terminated hydrophilic polyoxyethylene chain on the hydrophobe. Typical hydrophobes are constituted by long chain hydrocarbon-substituted phenols, such as octyl phenol and nonyl phenol. The ethylene oxide chain typically contains from about 5 to about 50 mols of ethylene oxide per mol of alkyl phenol. Instead of an alkyl phenol, one can also employ long chain alcohols or even polyfunctional hydrophobes, such as polyoxypropylene glycol having a molecular weight in excess of about 800.

Regardless of the specific hydrophobe selected, the nonionic surfactant structure includes a hydrophobic entity which is preferably a long chain hydrocarbon containing from 6 to 22 carbon atoms, and an hydroxy terminated hydrophilic polyoxyethylene group. The anionic surfactants useful herein are formed by simply reacting 1 mol of phosphoric acid with each hydroxy equivalent in the starting nonionic surfactant. The reaction is a simple esterification reaction with the water of esterification being removed to facilitate the reaction.

Since phosphoric acid contains 3 acidic OH groups per molecule and since only one of these becomes involved in the formation of the phosphate ester, the other two acidic OH groups are left unreacted, and these can be neutralized with a base which is preferably an amine. Appropriate amines can be of diverse type and the amines which are useful for solubilizing organic acidic materials are themselves well known. Volatile amines are preferred and will be illustrated herein using diisopropyl amine. The neutralized product ionizes in water to form a polyanionic surfactant, one anionic group being formed for each of the unesterified neutralized OH groups in the phosphoric acid reactant.

The surfactants which are useful herein may thus be characterized as monoesters of phosphoric acid with a polyoxyethylene-containing nonionic surfactant.

It is to be understood that other nonionic surfactants may be present during the aqueous emulsion copolymerization so long as the required proportion of the polyanionic phosphate-based emulsifying agent is present.

Aqueous emulsions are usually formulated at high solids content, but low solids content is essential for an electrocoating bath, e.g., a resin solids content of 4%–25%, preferably 6–18%.

The invention is illustrated in the examples which follow, it being understood that all proportions in this specification and claims are by weight unless otherwise stated.

EXAMPLE

There are charged to a reactor 758 parts of distilled water, 5.4 parts of ammonium persulfate, and 0.9 parts of sodium dodecyl benzene sulfonate. There is then formed a monomer emulsion by adding a mixture of monomers to 728 parts of water containing 51.5 parts of a polyanionic phosphate ester surfactant (see note 1), 18 parts of diisopropanol amine, and 36 parts of a nonionic surfactant (see note 2). The monomer mixture which is emulsified is as follows:

| Material | Parts | Percent of Total Monomers |
| --- | --- | --- |
| Styrene | 270 | 15 |
| Methyl methacrylate | 477 | 26.5 |
| n-Butyl acrylate | 927 | 51.5 |
| 2-Hydroxyethyl methacrylate (94% purity) | 96 | 5 |
| Methacrylic acid | 36 | 2 |
| t-Butyl mercaptan | 18 | 1 |
| | | 101 |

The monomer emulsion is added to the reactor incrementally over a period of 2½ hours. The reactor charge is preheated to a temperature of 80° C. After all of the monomer emulsion is added, the temperature of 80° C. is maintained for two hours, during which time 10 parts of water and 14 parts of diisopropanol amine are added. The theoretical solids content is 55%, and the actual solids content is 54.5%, indicating almost complete conversion of monomer to polymer. The emulsion has a pH of 6.9 and a viscosity of 516 centipoises (Brookfield, 20 RPM, #2 spindle). The emulsion copolymer particles have an average diameter of 0.17 micron and a $T_g$ of 0° C. The small proportion of methacrylic acid is insufficient to solubilize the emulsion copolymer, and about 25% of it is neutralized by the amine.

The emulsion is useful for electrocoating by simply reducing its solids content to 10% by addition of deionized water and pigmenting the same with titanium dioxide rutile (chloride process) to a pigment to binder ratio of 0.4 to 1.0. Electrodeposition at a voltage of 200 volts, and a bath temperature of 90° C. electrodeposited films having a thickness of 1.0-1.2 mil (electrodeposition time = 90 seconds). The coatings were cured for 16 minutes at 250° F. and were found to be smooth, moderately hard, highly resistant to methyl ethyl ketone, and excellently flexible (pass ⅛ inch conical mandrel test) and possessed good impact resistance.

Note 1 — The surfactant is a monoester of phosphoric acid and an oxyethylated octyl phenol containing 9 mols of ethylene oxide per mol of phosphoric acid, the monoester being neutralized with diisopropyl amine. It is used as a 70% solution in water. The commercial polyanionic phosphate based emulsifier Triton QS 9 (Rohm & Haas) may be used.

Note 2 — The nonionic surfactant is a block copolymer of propylene oxide on a polyoxyethylene core containing 10% by weight of ethylene oxide and terminated with polyoxypropylene having a molecular weight of 3100 (total mol. wt. about 3200). Triton X 405 (Rohm & Haas) is also useful. The commercial product Pluronic 31R1 (Wyandotte) may be used.

It will be understood that a small amount of mercaptan is used in the Example. It serves to lower the molecular weight which is still much higher than is normally obtained by a solution polymerization. The high molecular weight of the product, together with the small proportion of acid contained therein, is such that the copolymer is essentially insoluble in water. The lowering of molecular weight provides superior reflow on baking and more uniform film deposition leading to the production of enhanced film gloss. On the other hand, if the mercaptan is omitted, the film still forms in the same way, and is, indeed, superior to the film provided in this example, though the gloss and surface smoothness of the film are lowered.

It is also desired to point out that the methacrylic acid content in the Example is not necessary to provide a useful emulsion copolymer, or to enable electrodeposition thereof. The acid content of the emulsion copolymer is, however, highly useful since it provides an emulsion having improved freeze-thaw stability, and the acid-containing copolymer is more highly adherent to a metal substrate on which it is deposited.

We claim:

1. A method for electrodepositing a continuous polymer film on a conductive substrate comprising, passing a unidirectional electrical current through an aqueous bath of emulsion copolymer particles and then through said conductive substrate as anode, said emulsion copolymer particles being provided by aqueous emulsion copolymerization of monoethylenically unsaturated monomers in the presence of about 0.5-5% of the weight of materials subjected to copolymerization, of a polyanionic phosphate-based emulsifying agent, and then withdrawing the coated anode from said bath.

2. A method as recited in claim 1 in which said aqueous emulsion copolymer has a $T_g$ below about 10° C.

3. A method as recited in claim 2 in which said coated anode is air dried or baked at a temperature of less than 300° F.

4. A method as recited in claim 2 in which said emulsion copolymer has a $T_g$ above about 0° C. and said aqueous bath includes a water immiscible coalescing solvent.

5. A method as recited in claim 4 in which said water immiscible coalescing solvent is present in an amount of from 5-15%, based on the total weight of resin the the bath.

6. A method as recited in claim 1 in which said aqueous bath contains less than about 10% of water miscible organic solvent.

7. A method as recited in claim 1 in which said bath includes from 2% to 10% of aminoplast resin, based on the total weight of the emulsion copolymer.

8. A method as recited in claim 7 in which said emulsion copolymer includes copolymerized monomer providing reactive groups selected from hydroxy, amide and N-methylol groups.

9. A method as recited in claim 1 in which said emulsion copolymer includes copolymerized carboxyl functional monomer in an amount up to 3% of the weight of the copolymer.

10. A method as recited in claim 1 in which said aqueous emulsion copolymerization is carried out in the presence of up to 3% mercaptan based on materials being copolymerized.

11. A method a recited in claim 1 in which said polyanionic phosphate-based emulsifying agent is a neutralized ester reaction product of about 1 mol of phosphroic acid per hydroxy equivalent of a polyoxyethylene-containing nonionic surfactant.

12. A method as recited in claim 11 in which said neutralization is with a volatile amine.

13. A method as recited in claim 11 in which said nonionic surfactant is a monohydric hydrophobe oxyethylated with from about 5 to about 50 mols of ethylene oxide per mol of hydrophobe.

14. A method as recited in claim 13 in which said hydrophobe is selected from phenols and alcohols containing a long chain hydrocarbon group of from 6 to 22 carbon atoms.

* * * * *